United States Patent
Shimoga Manjunatha et al.

(10) Patent No.: US 10,848,552 B2
(45) Date of Patent: Nov. 24, 2020

(54) DETERMINING WHETHER TO PERFORM ADDRESS TRANSLATION TO FORWARD A SERVICE REQUEST OR DENY A SERVICE REQUEST BASED ON BLOCKED SERVICE ATTRIBUTES IN AN IP TABLE IN A CONTAINER-BASED COMPUTING CLUSTER MANAGEMENT SYSTEM

(71) Applicant: Hewlett Packard Enterprise Development LP, Houston, TX (US)

(72) Inventors: Praveen Kumar Shimoga Manjunatha, Bangalore Karnataka (IN); Sonu Sudhakaran, Bangalore Karnataka (IN); Selvakumar Sanmugam, Bangalore Karnataka (IN); Krishna Mouli Tankala, Bangalore Karnataka (IN); Pradeep Sathasivam, Bangalore Karnataka (IN); John Joseph McCann, III, Fort Collins, CO (US); Sangeeta Maurya, Bangalore Karnataka (IN); Koteswara Rao Kelam, Bangalore Karnataka (IN); Syed Ahmed Mohiuddin Peerzade, Bangalore Karnataka (IN); Ravikumar Vallabhu, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 159 days.

(21) Appl. No.: 15/994,073

(22) Filed: May 31, 2018

(65) Prior Publication Data

US 2019/0306231 A1 Oct. 3, 2019

(30) Foreign Application Priority Data

Mar. 29, 2018 (IN) .............................. 201841012010

(51) Int. Cl.
*H04L 29/08* (2006.01)
*H04L 29/12* (2006.01)
(Continued)

(52) U.S. Cl.
CPC ........ *H04L 67/1031* (2013.01); *G06F 9/5083* (2013.01); *H04L 61/2007* (2013.01);
(Continued)

(58) Field of Classification Search
CPC ............. H04L 67/1031; H04L 61/2007; H04L 61/255; H04L 63/0263; H04L 63/0281;
(Continued)

(56) References Cited

U.S. PATENT DOCUMENTS 6,392,990 B1 * 5/2002 Tosey ................ H04L 29/12018
370/218
6,801,949 B1 * 10/2004 Bruck ............... H04L 29/12009
709/232

(Continued)

FOREIGN PATENT DOCUMENTS

| CN | 103957237 A | 7/2014 |
|---|---|---|
| CN | 106888254 A | 6/2017 |
| WO | 2012/057956 A2 | 5/2012 |

OTHER PUBLICATIONS

Amazon Web Services, Inc., "Elastic Load Balancing," 2017, pp. 1-7.
(Continued)

*Primary Examiner* — Daniel C. Murray
(74) *Attorney, Agent, or Firm* — Hewlett Packard Enterprise Patent Department

(57) ABSTRACT

In an example, a container cluster management system includes a cluster manager providing access to services provided by containers within a container cluster and a plurality of nodes. Each node has access to an IP table, and
(Continued)

is to forward a service request for a service received via the cluster manager to at least one container sub-cluster by translating a destination address of the service request to an IP address of a container sub-cluster. At least one of the nodes comprises a proxy manager, to manage an IP table of the node and a service firewall, to add a service-specific rule to the IP table.

19 Claims, 6 Drawing Sheets

(51) Int. Cl.
    *H04L 29/06*     (2006.01)
    *G06F 9/50*     (2006.01)

(52) U.S. Cl.
    CPC ........ *H04L 61/255* (2013.01); *H04L 63/0263* (2013.01); *H04L 63/0281* (2013.01); *H04L 67/1034* (2013.01); *H04L 67/16* (2013.01); *H04L 67/32* (2013.01)

(58) Field of Classification Search
    CPC ..... H04L 67/1034; H04L 67/16; H04L 67/32; G06F 9/5083
    See application file for complete search history.

(56) References Cited

U.S. PATENT DOCUMENTS

| | | | | |
|---|---|---|---|---|
| 7,200,865 | B1* | 4/2007 | Roscoe | H04L 63/104 726/12 |
| 7,299,294 | B1* | 11/2007 | Bruck | H04L 29/12216 709/201 |
| 7,373,644 | B2* | 5/2008 | Aborn | H04L 67/1008 709/223 |
| 7,546,354 | B1* | 6/2009 | Fan | G06F 11/2025 709/219 |
| 7,657,501 | B1* | 2/2010 | Brown | G06F 16/2471 707/999.002 |
| 7,962,582 | B2* | 6/2011 | Potti | H04L 41/5012 709/220 |
| 8,306,951 | B2* | 11/2012 | Ghosh | G06F 11/2097 707/646 |
| 8,434,080 | B2* | 4/2013 | Yendluri | G06F 8/60 717/177 |
| 8,706,798 | B1* | 4/2014 | Suchter | H04L 43/0876 709/202 |
| 8,806,605 | B1* | 8/2014 | Chickering | H04L 63/0227 726/11 |
| 8,954,979 | B1* | 2/2015 | Myers | G06F 9/5083 718/104 |
| 9,027,087 | B2* | 5/2015 | Ishaya | G06F 9/468 726/4 |
| 9,141,410 | B2* | 9/2015 | Leafe | G06F 9/5022 |
| 9,143,530 | B2* | 9/2015 | Qureshi | G06F 21/12 |
| 9,154,367 | B1* | 10/2015 | Kontothanassis | H04L 29/08279 |
| 9,304,999 | B1* | 4/2016 | Bono | G06F 9/5083 |
| 9,471,798 | B2* | 10/2016 | Vepa | G06F 21/604 |
| 9,529,996 | B2* | 12/2016 | Qureshi | G06F 21/53 |
| 9,563,480 | B2* | 2/2017 | Messerli | H04L 67/16 |
| 9,634,948 | B2* | 4/2017 | Brown | H04L 63/0245 |
| 9,692,727 | B2* | 6/2017 | Zhou | G06F 9/45533 |
| 9,755,898 | B2* | 9/2017 | Jain | H04L 41/0813 |
| 9,813,307 | B2* | 11/2017 | Walsh | H04L 67/025 |
| 9,819,699 | B1* | 11/2017 | Nenov | H04L 63/20 |
| 9,870,412 | B2* | 1/2018 | Ghosh | G06F 16/27 |
| 9,935,829 | B1* | 4/2018 | Miller | G06F 15/177 |
| 9,935,834 | B1* | 4/2018 | Baveja | H04L 12/4641 |
| 9,985,894 | B1* | 5/2018 | Baveja | H04L 47/125 |
| 10,033,631 | B1* | 7/2018 | Baveja | H04L 45/306 |
| 10,075,429 | B2* | 9/2018 | Jayanti Venkata | G06F 8/61 |
| 10,091,112 | B1* | 10/2018 | Sharma | H04L 45/38 |
| 10,091,238 | B2* | 10/2018 | Shieh | H04L 63/1408 |
| 10,110,668 | B1* | 10/2018 | Sharma | H04L 43/10 |
| 10,133,619 | B1* | 11/2018 | Nagpal | G06F 11/0787 |
| 10,181,047 | B2* | 1/2019 | Lim | G06F 16/122 |
| 10,191,758 | B2* | 1/2019 | Ross | H04L 45/74 |
| 10,284,473 | B1* | 5/2019 | Sharma | H04L 63/0227 |
| 10,326,672 | B2* | 6/2019 | Scheib | H04L 43/0888 |
| 10,333,986 | B2* | 6/2019 | Lian | H04L 41/5025 |
| 10,348,767 | B1* | 7/2019 | Lee | H04L 63/1441 |
| 10,367,787 | B2* | 7/2019 | Gupta | H04L 63/10 |
| 10,382,329 | B1* | 8/2019 | Thomas | H04L 45/748 |
| 10,432,638 | B2* | 10/2019 | Nambiar | H04L 63/101 |
| 10,439,987 | B2* | 10/2019 | Church | H04L 63/0272 |
| 10,445,197 | B1* | 10/2019 | Harpreet | G06F 11/2028 |
| 10,469,389 | B1* | 11/2019 | Sharma | H04L 67/1008 |
| 10,491,522 | B2* | 11/2019 | Sharma | H04L 47/2483 |
| 10,530,747 | B2* | 1/2020 | Saxena | G06F 9/54 |
| 10,574,513 | B2* | 2/2020 | Nagarajan | H04L 43/0805 |
| 10,608,881 | B2* | 3/2020 | Teng | H04L 41/0893 |
| 10,608,990 | B2* | 3/2020 | Parvanov | H04L 63/0263 |
| 10,659,523 | B1* | 5/2020 | Joseph | H04L 67/10 |
| 10,698,714 | B2* | 6/2020 | Krishnamurthy | H04L 41/0806 |
| 10,708,082 | B1* | 7/2020 | Bakiaraj | H04L 45/586 |
| 10,708,230 | B2* | 7/2020 | Huang | H04L 63/0263 |
| 2002/0049859 | A1 | 4/2002 | Bruckert | H04L 29/12367 709/246 |
| 2003/0018927 | A1* | 1/2003 | Gadir | G06F 11/1484 714/4.11 |
| 2003/0217134 | A1* | 11/2003 | Fontoura | G06F 9/5083 709/223 |
| 2004/0088408 | A1* | 5/2004 | Tsyganskiy | H04L 63/1408 709/225 |
| 2004/0215639 | A1* | 10/2004 | Bamford | G06F 16/27 |
| 2007/0060143 | A1* | 3/2007 | Bhatti | H04L 61/00 455/445 |
| 2007/0083725 | A1* | 4/2007 | Kasiolas | G06F 3/0605 711/165 |
| 2010/0287263 | A1* | 11/2010 | Liu | G06F 9/5088 709/221 |
| 2011/0071981 | A1* | 3/2011 | Ghosh | G06F 16/27 707/634 |
| 2012/0233668 | A1* | 9/2012 | Leafe | G06F 9/00 726/4 |
| 2013/0046731 | A1* | 2/2013 | Ghosh | G06F 11/2038 707/622 |
| 2013/0159487 | A1* | 6/2013 | Patel | H04L 61/2007 709/223 |
| 2013/0205028 | A1* | 8/2013 | Crockett | G06F 9/5027 709/226 |
| 2013/0212264 | A1* | 8/2013 | Troppens | G06F 11/2005 709/224 |
| 2013/0219010 | A1* | 8/2013 | Mahendran | H04L 61/2046 709/217 |
| 2013/0326507 | A1* | 12/2013 | McGrath | G06F 9/4856 718/1 |
| 2014/0047084 | A1* | 2/2014 | Breternitz | H04L 67/1008 709/221 |
| 2014/0130054 | A1* | 5/2014 | Molkov | G06F 9/5072 718/104 |
| 2014/0215057 | A1* | 7/2014 | Walsh | H04L 67/025 709/224 |
| 2014/0282889 | A1* | 9/2014 | Ishaya | H04L 63/0876 726/4 |
| 2015/0082417 | A1* | 3/2015 | Bhagwat | H04L 63/0263 726/13 |
| 2015/0134822 | A1* | 5/2015 | Bhagwat | H04L 47/70 709/226 |
| 2015/0156183 | A1* | 6/2015 | Beyer | H04L 63/08 726/4 |
| 2016/0021026 | A1* | 1/2016 | Aron | H04L 47/827 709/226 |
| 2016/0094668 | A1* | 3/2016 | Chang | H04L 63/0227 709/223 |
| 2016/0170668 | A1* | 6/2016 | Mehra | G06F 9/5088 711/165 |
| 2016/0212012 | A1* | 7/2016 | Young | G06F 9/45558 |

(56) References Cited

U.S. PATENT DOCUMENTS

| | | | | |
|---|---|---|---|---|
| 2016/0359697 | A1* | 12/2016 | Scheib | G06F 16/24578 |
| 2017/0004057 | A1* | 1/2017 | Brown | H04L 61/6013 |
| 2017/0093661 | A1* | 3/2017 | Deulgaonkar | H04L 67/10 |
| 2017/0199770 | A1* | 7/2017 | Peteva | G06F 9/5088 |
| 2017/0331739 | A1* | 11/2017 | Sharma | H04L 63/02 |
| 2018/0019969 | A1* | 1/2018 | Murthy | H04L 61/2007 |
| 2018/0063025 | A1* | 3/2018 | Nambiar | G06F 9/5061 |
| 2018/0205652 | A1* | 7/2018 | Saxena | G06F 9/54 |
| 2018/0234459 | A1* | 8/2018 | Kung | H04L 63/0263 |
| 2018/0295036 | A1* | 10/2018 | Krishnamurthy | H04L 63/20 |
| 2018/0359218 | A1* | 12/2018 | Church | H04L 63/0272 |
| 2018/0367371 | A1* | 12/2018 | Nagarajan | H04L 43/0811 |
| 2019/0097975 | A1* | 3/2019 | Martz | H04W 12/0808 |
| 2020/0099610 | A1* | 3/2020 | Heron | H04L 45/04 |
| 2020/0106744 | A1* | 4/2020 | Miriyala | H04L 63/20 |
| 2020/0137185 | A1* | 4/2020 | Parekh | G06F 9/5061 |

OTHER PUBLICATIONS

Armstrong, D., et al., "Towards Energy Aware Cloud Computing Application Construction," Jun. 23, 2017, pp. 1-23.

Banerjee, P. K.; "Deploying a Service on a Kubernetes Cluster," Mar. 8, 2016, pp. 1-10.

Bhatia, J.; "A Dynamic Model for Load Balancing in Cloud Infrastructure," NIRMA University Journal of Engineering and Technology, Jan.-Jun. 2015, pp. 15-19, vol. 4, No. 1.

F5 Networks, Inc. "Load Balancing 101: Nuts and Bolts," White Paper, May 10, 2017, pp. 1-8.

Kabar, N.; "Docker Reference Architecture: Service Discovery and Load Balancing with Docker Universal Control Plane (UCP 1.1)," 2017, pp. 1-16.

Openshift; "Application Health," 2017, pp. 1-2 [online], Retrieved from the Internet on Dec. 5, 2017 at URL: <docs.openshift.com/container-platform/3.4/dev_guide/application_health.html>.

Openshift; "Using a Service External IP to Get Traffic into the Cluster," 2017, pp. 1-7 [online], Retrieved from the Internet on Dec. 5, 2017 at URL: <docs.openshift.com/container-platform/3.4/dev_guide/expose_service/expose_internal_ip_service.html>.

Scholes, M.; "Deploy an App Into Kubernetes Using Advanced Application Services," Jun. 22, 2017, pp. 1-11.

Slideshare.net; "Kubernetes and Software Load Balancers," Mar. 24, 2017, pp. 1-10 [online], Retrieved from the Internet on Dec. 5, 2017 at URL: <slideshare.net/haproxytech/kubernetes-and-software-load-balancers-73598367>.

The Openstack; "Load-Balancing Policy," Dec. 4, 2017, pp. 1-6.

Total Uptime, "Load Balancing and Failover Between AWS Regions," Sep. 19, 2015, pp. 1-3 [online], Total Uptime Technologies, LLC, Retrieved from the Internet on Dec. 5, 2017 at URL: <totaluptime.com/load-balancing-and-failover-between-aws-regions/>.

Michael Churchman, "Load-Balancing in Kubernetes," Aug. 14, 2017, pp. 1-5, Retrieved from the Internet on Apr. 20, 2020 at URL: <web.archive.org/web/20180327002500/http://rancher.com/load-balancing-in-kubernetes/>.

Coles et al., "Rapid Node Reallocation Between Virtual Clusters for Data Intensive Utility Computing", 2006 IEEE International Conference on Cluster Computing, Sep. 1, 2006 (Sep. 1, 2006), 10 pages.

European Search Report and Search Opinion Received for EP Application No. 19165945.7, dated Jul. 8, 2019, 11 pages.

European Search Report and Search Opinion Received for EP Application No. 19165946.5, dated Jul. 10, 2019, 10 pages.

* cited by examiner

DETERMINING WHETHER TO PERFORM ADDRESS TRANSLATION TO FORWARD A SERVICE REQUEST OR DENY A SERVICE REQUEST BASED ON BLOCKED SERVICE ATTRIBUTES IN AN IP TABLE IN A CONTAINER-BASED COMPUTING CLUSTER MANAGEMENT SYSTEM

BACKGROUND

Containerized computing systems provide a readily scalable architecture for the individual deployment of a plurality of programs which may utilise the same underlying resource.

BRIEF DESCRIPTION OF DRAWINGS

Non-limiting examples will now be described with reference to the accompanying drawings, in which.

DETAILED DESCRIPTION

Figure 1:
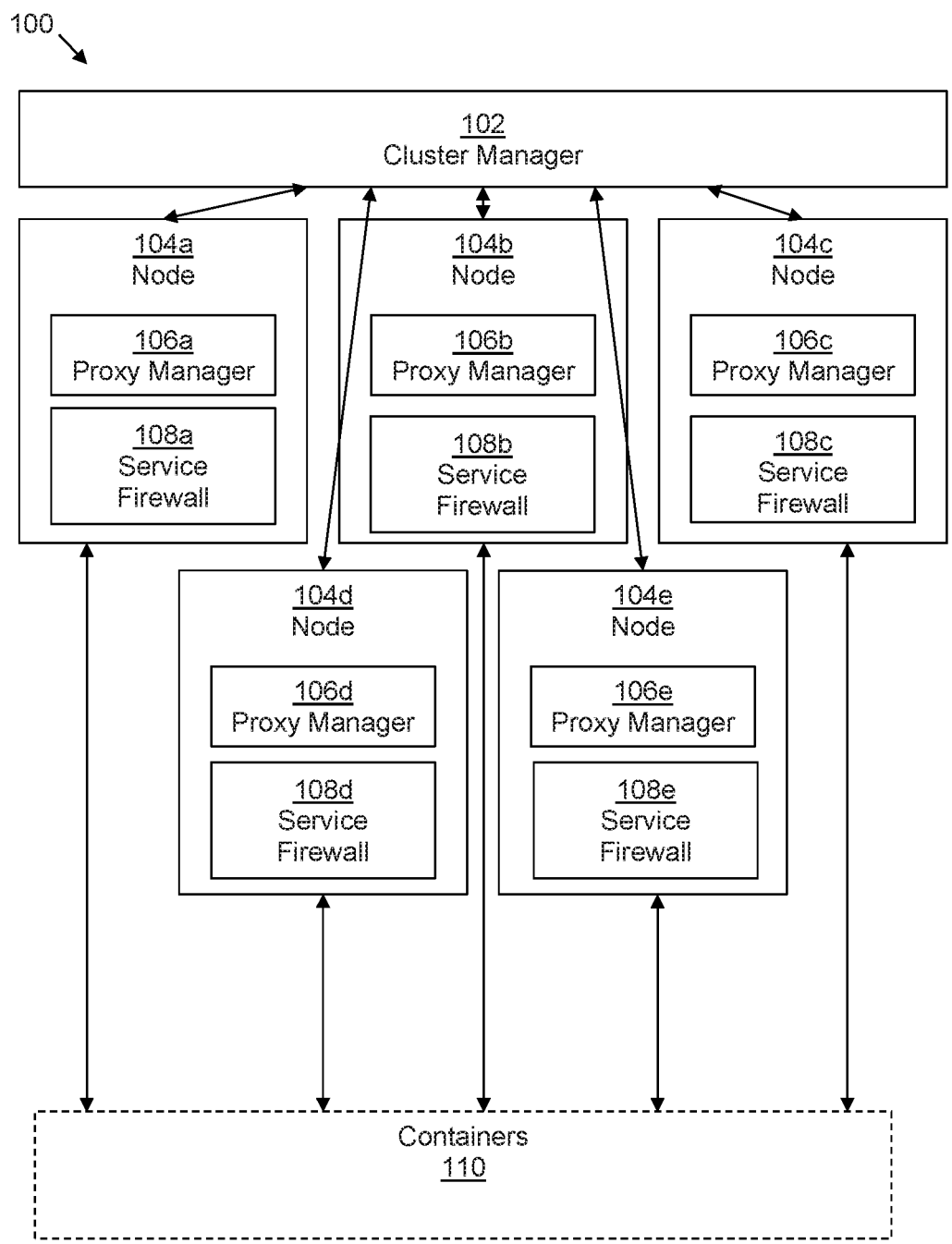
FIG. 1 is a block diagram of an example of a containerized computing management system.

The following discussion is directed to various examples of the disclosure. The examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to. The term "based on" means based at least in part on.

Some computing systems employ 'containerization'. Containerization can take place at the operating system level. In some examples, mutually isolated computing instances, known as containers (or in some examples, by other terms such as virtualisation engines or partitions), operate as separate computers from the point of view of programs deployed thereon. While a deployed program may utilise, and be aware of, the resources of its container, it may generally be unaware of the resources of any other container, even where an underlying physical resource is shared.

Thus, a computing resource such as a computer, a server, a memory or the like, may have part of its resources allocated to one container and another part allocated to another. Programs running within containers (and in some examples, there may be several programs running within each container) have access only to the resources allocated to the container. Such computing resources allow for ease of scalability and accessibility of the same underlying resource by mutually distrusting entities with little additional overhead. An example of a container manager and deployment system is Kubernetes.

Solutions for load balancing in containerized computing systems include plugins utilising elastic load balancers to provide external access for containerized services. Such plugins are specialised, advanced features which are specifically tailored to a particular implementation/service provider. Moreover, such solutions may introduce latency into the deployment of containerized services.

In examples described herein, a processing resource may include, for example, one processing resource or multiple processing resources included in a single computing device or distributed across multiple computing devices. As used herein, a "processing resource" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution of instructions stored on a machine-readable storage medium, or a combination thereof. In examples described herein, entities may communicate with one another via direct connections, via one or more computer networks, or a combination thereof. In examples described herein, a computer network may include, for example, a local area network (LAN), a virtual LAN (VLAN), a wireless local area network (WLAN), a virtual private network (VPN), the Internet, or the like, or a combination thereof.

In examples described herein, a "node" entity is a virtualised processing resource, which may run on all or part of a computing device, such as a server, storage array, storage device, desktop or laptop computer, switch, router, or any other processing device or equipment including a processing resource.

FIG. 1 is an example of a container cluster management system 100 comprising a cluster manager 102 and a plurality of nodes 104a-e. In use of the system 100, the cluster manager 102 provides access to services provided by containers 110.

Each node 104 of the plurality of nodes 104a-e has access to an IP table. The IP table may, for example be stored in a storage resource such as a volatile or non-volatile memory which the node 104 can access. In some examples, a node 104 may be provided as a virtual machine on a processing device and the IP table may be stored in a storage resource of the processing device.

At least one (and in the illustrated example, each) node 104a-e comprises a proxy manager 106a-e and a service firewall 108a-e. Although shown separately herein, a service firewall 108 may constitute part of a proxy manager 106. In use of the system 100, each proxy manager 106 manages the IP table of its node and each service firewall 108 adds service-specific rules to the IP table of its node. While each node is shown as comprising a service firewall 108, this may not be the case in all examples. In some examples, some nodes of the system 100 may comprise a service firewall 108 whereas other nodes of the system 100 may not.

A service may comprise a predetermined set of 'pods', where a pod is a logical host of a set of containers or, expressed another way, a pod comprises a sub-cluster of related containers. For example, a pod's containers may be co-located and co-scheduled, and run in a shared context. Containers within a pod may share an IP address and/or port space, and may be able to communicate with one another (whereas, generally, containers in different pods may have distinct IP addresses and are not typically in direct communication with one another, instead communicating via Pod IP addresses and the like). Applications deployed within a pod may have access to shared 'volumes', which are usually directories, in some examples holding data. Such volumes may be logically considered to be part of a pod, and may have the same life cycle as a pod.

To consider a particular example, a pod may comprise frontend and backend containers, where the frontend containers may provide user interfaces and the like and the backend containers may provide databases, data processing and the like. The containers may work together to provide a service.

A pod (as well as an individual container) may be a temporary configuration. Pods may be created, assigned a unique ID, and scheduled to nodes 104 where they remain until termination (according to restart policy) or deletion. In some examples, if a node 104 fails, the pods scheduled to that node 104 may be scheduled for deletion, after a timeout period.

In use of the system 100, a node 104 forwards service requests for a service received via the cluster manager 102 to at least one container sub-cluster by translating the destination address of the service request to an IP address of a container sub-cluster (which may comprise one or more pods). For example this may utilise Destination Network Address Translation (DNAT) and redirect the incoming traffic to the pod or pods which make up the service identified by the IP address. In some examples, the pods have different IP addresses and, where there is more than one pod, this redirection may be intended to forward traffic to a given pod with a predetermined probability (e.g. an equal probability). A pod's reply may be routed back to a service IP address, i.e. the node 104, and then forwarded thereby to a client.

In this example, the proxy manager 106 manages the IP table of the node and the service firewall 108 adds at least one service-specific rule to the IP table.

This allows load balancing of services through post-routing Destination Network Address Translation (DNAT) rules. In some examples, the at least one rule may comprise a 'deny' rule. A deny rule may prevent access to a service via any port and/or using any protocol other than an expected port/protocol. For example, a service may be accessible using an IP address and at least one of a specified port and/or a specified protocol. A deny rule may be configured so as to prevent user access to ports other than the specified port, even if the request comprises the 'correct' IP address of the service. Another rule may be provided for protocols other than the specified protocol (for example, User Datagram Protocol (udp), or Transmission Control Protocol (tcp), or any other network protocol). There may be a single specified protocol and/or port for each service.

In some examples, a service may be detected on creation, or may be detected on making its first request to a node 104. In some examples, whenever a service is created, at least one address translation rule (e.g. a DNAT rule, which may comprise a rule for carrying out an address translation) and at least one deny rule may be added to the IP table.

Such a solution de-couples load balancing from a provider (e.g. a cloud provider), and can be handled within the cluster manager 102. The IP table may be a Linux IP table, which may increase the portability and ease of scalability of the solution.

There may be minimal lag in implementing the rules; updating the IP table is an efficient process and therefore the solution may be lightweight and easily maintainable. In some examples, deny rules may be structured so as to deny access to a service via any port other than a predetermined port (in some example, a predetermined single port). In such an example, security may be enhanced. In some examples, deny rules may be structured so as to deny access to a service using any protocol other than a predetermined protocol (in some example, a predetermined single protocol). In some examples, deny rules may be structured so as to deny access to a service using any protocol or port combination other than a predetermined protocol and port combination. The predetermined port/protocol may be specified in a service specification, which may be stored or accessible to the cluster manager 102.

Each of the cluster manager 102, nodes 104a-e, proxy manager 106 and/or the service firewall 108 may be any combination of hardware and programming to implement the described functionalities. In examples described herein, such combinations of hardware and programming may be implemented in a number of different ways. For example, programming may be processing resource executable instructions stored on at least one non-transitory machine-readable storage medium and the hardware may include at least one processing resource to execute those instructions. In some examples, the hardware may also include other electronic circuitry to at least partially implement at least one of the cluster manager 102, nodes 104a-e, proxy manager 106 and/or the service firewall 108. In some examples, the at least one machine-readable storage medium may store instructions that, when executed by the at least one processing resource, at least partially implement some or all of the cluster manager 102, nodes 104a-e, proxy manager 106 and/or the service firewall 108. In such examples, a computing device at least partially implementing the processing cluster manager 102 and/or a node 104a-e may include the at least one machine-readable storage medium storing the instructions and the at least one processing resource to execute the instructions. In other examples, cluster manager 102, nodes 104a-e, proxy manager 106 and/or the service firewall 108 may be implemented by electronic circuitry.

Figure 2:
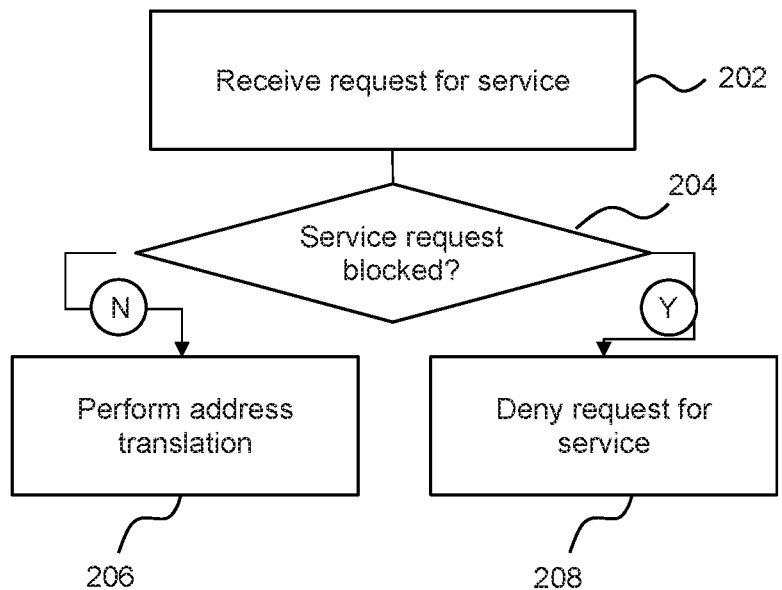
FIG. 2 is a flow chart of an example of a method of managing a containerized computing system.

FIG. 2 is a flowchart showing an example of a method, which may be a method of managing a container-based computing cluster. Block 202 comprises receiving, at a node of a container-based computing cluster, a request for a service. Block 204 comprises determining if the service request comprises blocked service attributes. For example, this may comprise determining if a request for a service is a request to access the service via a port or protocol which is listed as a blocked port or protocol in a deny rule of an IP table of the node. In another examples, a port or protocol may be defined as an accepted port or protocol, and only such ports or protocols may be accepted for forwarding. When the port or protocol is not a blocked a port or protocol, an address translation is performed to forward the request to a container sub-duster of the container-based computing cluster in block 206. Otherwise (i.e. when the request is a blocked request), block 208 comprises denying the request for the service.

For example, a service request may be made by referring to a protocol, an IP address of the service and the port. Such a request may have the format: <PROTOCOL>://<IP Address>:<Port>, and the identity of the IP address as well as the port and/or protocol may be defined in a service specification. Port(s) and/or protocol(s) other than the specified port and/or protocol may be specified (positively or negatively) within one or a set of deny rules.

For example, the IP table may be initialised as follows:

A: sudo iptables -t nat -N KUBE-MARK-DROP-LB

This inserts a new rule called "KUBE-MARK-DROP-LB"

B: sudo iptables -t nat -A KUBE-MARK-DROP-LB -j MARK --set-xmark 0x8000/0x8000

This rule specifies that packets marked with a 32 bit value (in this example, 0x8000, but this value could be different in other examples) should be dropped. This value is a value which is utilised in Kubernetes to identify and drop packages, although in principle another value could be used.

C: sudo iptables -t nat -A KUBE-MARK-DROP-LB -j ACCEPT

Packets with other values may however be accepted in this rule chain, so that they will be forwarded to the next rule set for onward processing.

Then, on creation of a service, the following code may be executed:

D: sudo iptables -t nat -N<SERVICE-NAME_NAMESPACE>

This creates a new chain with a unique name based on a combination of the service name and a namespace value. This chain will identify packets to forward to the KUBE-MARK-DROP-LB chain described above.

E: sudo iptables -t nat -I PREROUTING --destination <ExtIP> -j <SERVICE-NAME_NAMESPACE>

This inserts a rule in a rule chain "PREROUTING", which captures and redirects any packet with a destination address <ExtIP> to the new chain <SERVICE-NAME_NAMESPACE>

F: sudo iptables -t nat -A <SERVICE-NAME_NAMESPACE> -p < PROTOCOL> -m multiport --dports <SER-PORT,NODE-PORT> -j RETURN This appends a rule to the new chain <SERVICE-NAME_NAMESPACE> which returns the processing of the packet to the standard processing route for address translation if the protocol matches <PROTOCOL> and destination ports match <SER-PORT, NODE-PORT>

G: sudo iptables -t nat -A <SERVICE-NAME> -j KUBE-MARK-DROP-LB

This serves to forward any packets which have not be redirected for normal processing at F to the "KUBE-MARK-DROP-LB" chain described above. The package will be marked using the value 0x8000 (although in principle other markings could be used), such that the packet will be dropped by KUBE-MARK-DROP-LB.

In other words, a packet directed to a particular external IP address (ExtIP) will be captured by rule E and handled by the chain <SERVICE-NAME_NAMESPACE>. If this packet specifies a protocol which matches <PROTOCOL> and destination ports which match <SER-PORT, NODE-PORT>, it is accepted and forwarded for address translation by rule F. If however it does not, it will be forwarded to the chain KUBE-MARK-DROP-LB, where, if it contains a value 0x8000, it will be dropped.

Therefore, if a request received in block 202 has an IP address as defined in the service specification but with a different port or protocol, such deny rule(s) may be applied such that the request is dropped (block 208). In some examples, as shown in the rule set above, there may be a single port or protocol which is allowed (i.e. not in a deny rule) for each service as identified by its IP address. I.e. the blocked ports and protocols are described negatively, with reference to an accepted port and protocol.

Such a method may be carried out by a node 104 of a system 100 as described in relation to FIG. 1.

Figure 3:
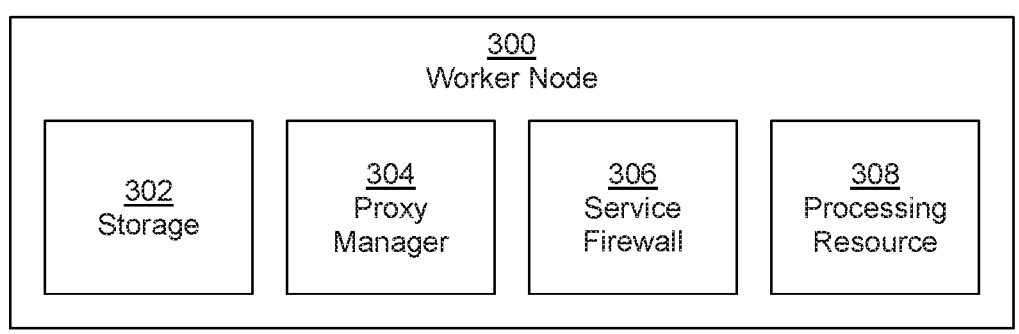
FIG. 3 is a block diagram of an example of a worker node of a containerized computing system.

FIG. 3 shows an example of a worker node 300 for deployment in a container cluster management system. The worker node 300 comprise storage 302 to store an IP table. For example, this may comprise non-volatile and/or volatile memory. The worker node 300 further comprises a proxy manager 304, which, when the node 300 is deployed, manages an IP table of the node stored in the storage 302, and a service firewall 306. In this example, when the node 300 is deployed, the service firewall 306 blocks a service request for a service by adding a deny rule for the service to the IP table. In some examples, the service firewall 306 is provided by the proxy manager 304.

The worker node 300 further comprises a processing resource 308 to forward a service request to at least one container sub-cluster by translating the destination address of the service request to an IP address of a container sub-cluster (e.g. a 'pod' as described above) using the IP table, unless the service request is a blocked service request. Such a node 300 may provide a node 104 of FIG. 1, or may carry out the method of FIG. 2.

Figure 4:
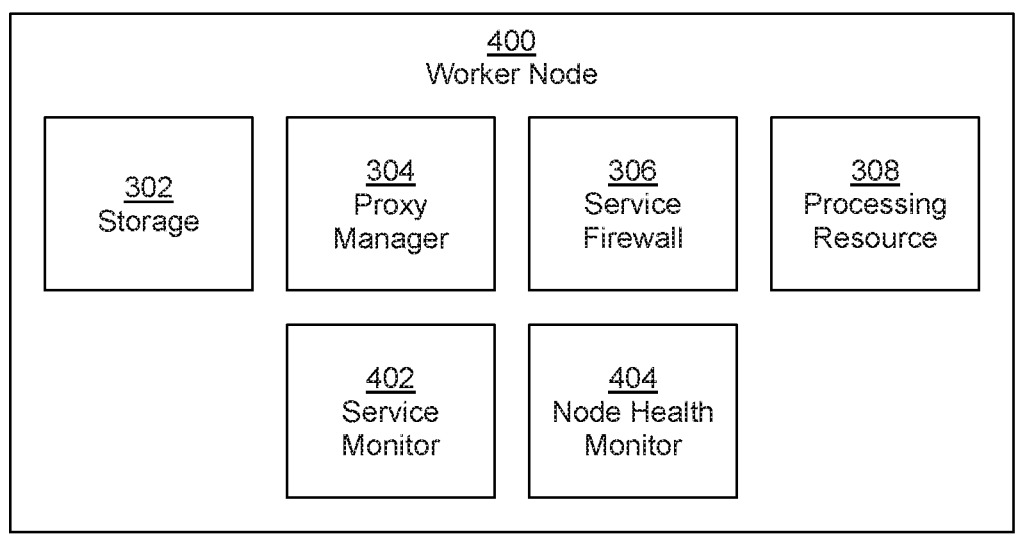
FIG. 4 is a block diagram of another example of a worker node of a containerized computing system.

FIG. 4 is another example of a worker node 400. In addition to the storage 302, proxy manager 304, service firewall 306 and processing resource 308, the node 400 further comprises a service monitor 402 and a node health monitor 404.

The service monitor 402 monitors for at least one external service. On detection of a service, the service firewall 306 is triggered to update the IP table in response to the detection. Detection of a service may for example comprise receiving a notification, which may be generated by a container management system with which the service monitor or associated apparatus is registered or associated (for example, the cluster manager 102). Such notifications may be generated for update and delete events, as well as for create events. In some examples, the service monitor 402 may comprise a component of the service firewall 306. In some examples, the node health monitor 404 monitors the operational status of the node 400 and provides a health-check message indicative of normal operation when in a normal operational state. The message may for example be provided to a cluster manager, such as the cluster manager 102 of FIG. 1, and/or to at least one other node 104. The node health monitor 404 may also, in some examples, monitor the health of other nodes 104, 400.

Each of the node 400, proxy manager 304, service firewall 306, processing resources 308, service monitor 402 and the node health monitor 404 may be any combination of hardware and programming to implement the described functionalities. In examples described herein, such combinations of hardware and programming may be implemented in a number of different ways. For example, programming may be processing resource executable instructions stored on at least one non-transitory machine-readable storage medium and the hardware may include at least one processing resource to execute those instructions. In some examples, the hardware may also include other electronic circuitry to at least partially implement at least one of the node 400, proxy manager 304, service firewall 306, processing resources 308, service monitor 402 and the node health monitor 404. In some examples, the at least one machine-readable storage medium may store instructions that, when executed by the at least one processing resource, at least partially implement some or all of the node 400, proxy manager 304, service firewall 306, processing resources 308, service monitor 402 and the node health monitor 404. In such examples, a computing device at least partially implementing the node 400 may include the at least one machine-readable storage medium storing the instructions and the at least one processing resource to execute the instructions. In other examples, the node 400, proxy manager 304, service firewall 306, processing resources 308, service monitor 402 and/or the node health monitor 404 may be implemented by electronic circuitry.

Figure 5:
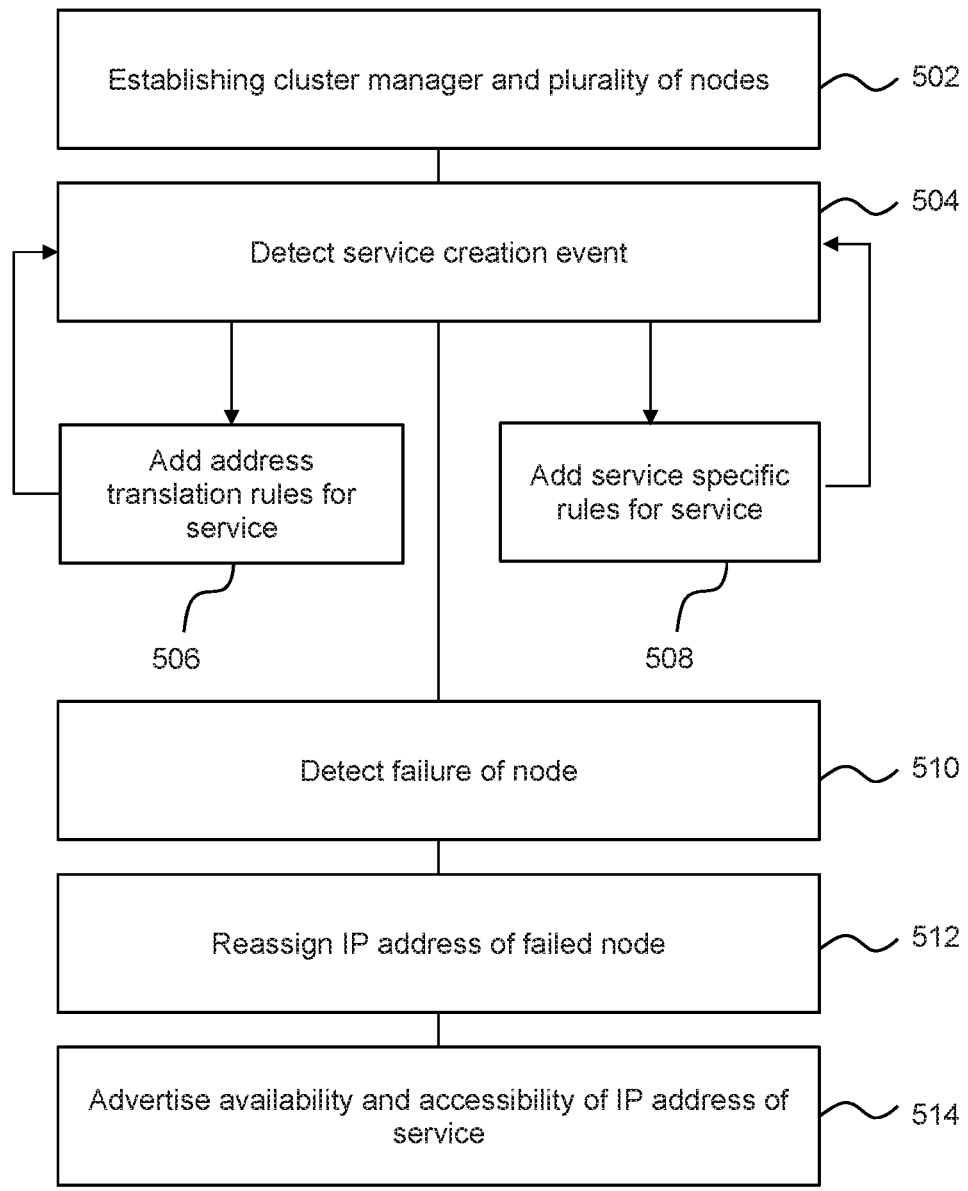
FIG. 5 is a flow chart of another example of a method of managing a containerized computing system.

FIG. 5 is an example of a method, which may in some examples be carried out at least in part by a node 400.

The method comprises, in block 502, establishing a cluster manager and a plurality of nodes. Block 504 comprises detecting a service creation event, for example on receipt of a notification from a cluster management entity such as a cluster manager 102. Block 506 comprises adding address translation rules for a first detected service to an IP table of a node. In some examples, the address translation rules may be added at a plurality of nodes. In block 508, service-specific 'deny' or 'block' rules are added to the IP table of at least one node (and in some examples, for a plurality of nodes) for the service.

For the sake of example, a service specific rule DNAT rule added in block 506 may comprise, in a Kubemetes container system:

-A KUBE-SERVICES -d 10.142.137.200/32 -p tcp -m comment --comment "default/nginx: external IP" -m tcp -dport 80 -m physdev ! --physdev-is-in -m addrtype ! --src-type LOCAL -j KUBE-SVC-4N57TFCL4MD7ZTDA This rule checks if a request is received on IP address 10.142.137.200 and with protocol tcp and on port 80. If the request is received on IP address 10.142.137.200 but with a protocol other than tcp and/or a port other than port 80, the packet may be diverted to other rule chains as set out above.

If the packet is accepted, the request is forwarded to another rule set -KUBE-SVC-4N57TFCL4MD7ZTDA, in this example comprising three rules set out below. In turn, if an IP table has been established in a manner to drop packets which are associated with that IP address, but associated with any protocol other than tcp and any port other than port 80, such packets will be dropped.

In this example, the three rules of the further rule set are:
-A KUBE-SVC-4N57TFCL4MD7ZTDA -m comment --comment "default/nginx:" -m statistic
--mode random --probability 0.25000000000 -j KUBE-SEP-YWXOX2RATT4U5XWP
-A KUBE-SVC-4N57TFCL4MD7ZTDA -m comment --comment "default/nginx:" -m statistic
--mode random --probability 0.33332999982 -j KUBE-SEP-62W5WRRO7TZHHJIR
-A KUBE-SVC-4N57TFCL4MD7ZTDA -m comment --comment "default/nginx:" -m statistic
-mode random -probability 0.50000000000 -j KUBE-SEP-XL4V4VLBKROVH7NR This rule set directs the request to a rule of a second rule set on a probability basis. The probability is decided based on the number of backend processing entities. The second rule set, in which the address translation is carried out, may be as follows:
-A KUBE-SEP-YWXOX2RATT4U5XWP -p tcp -m comment --comment "default/nginx:" -m tcp -j DNA T --to-destination 10.32.0.4:80
-A KUBE-SEP-XL4V4VLBKROVH7NR -p tcp -m comment --comment "default/nginx:" -m tcp j DNAT --to-destination 10.36.0.5:80
-A KUBE-SEP-62W5WRRO7TZHHJIR -p tcp -m comment --comment "default/nginx:" -m tcp j DNAT --to-destination 10.36.0.4:80

Each of the above three rules of the second rule set redirects the request to a particular backend.

Service specific deny rules may, for example, deny access to a service unless the request specifies a protocol and/or port which is not associated with a deny rule.

Block 510 comprises detecting a failure of a node and block 512 comprises reassigning the IP address of the failed node to another node. While in this example, node failure is detected, in another example, it may be determined that a node has become unhealthy. This provides for high-availability of the cluster. This may comprise updating a mapping table. In some examples, this may comprise updating a virtual router to node mapping table (a Node_ID-to-VRID mapping table, as described in greater detail below).

Block 514 comprises advertising at least one of an availability and an accessibility of an IP address of a service to a network. Advertising an availability may comprise sending or responding to a Virtual Router Redundancy Protocol (VRRP) advertisement. This may be carried out at any time, and in some examples periodically.

An example of reassigning an IP address, for example as set out in relation to blocks 510 and 512, is now discussed. Such methods may be used in conjunction with the described service specific rules such as deny rules, or separately therefrom. In other words, the methods of block 510 and 512 may be provided separately from the methods describe in blocks 502 to 508 and in block 514. In examples, there may be n nodes, each of which have IP addresses configured for a specific service, and this information may be held in a mapping table. Consider a scenario where:

Service-1 and service-2 have their IP addresses configured on node-1.
Service-3 and service-4 have their IP addresses configured on node-2.
Service-5 and service-6 have their IP addresses configured on node-3.

Figure 6:
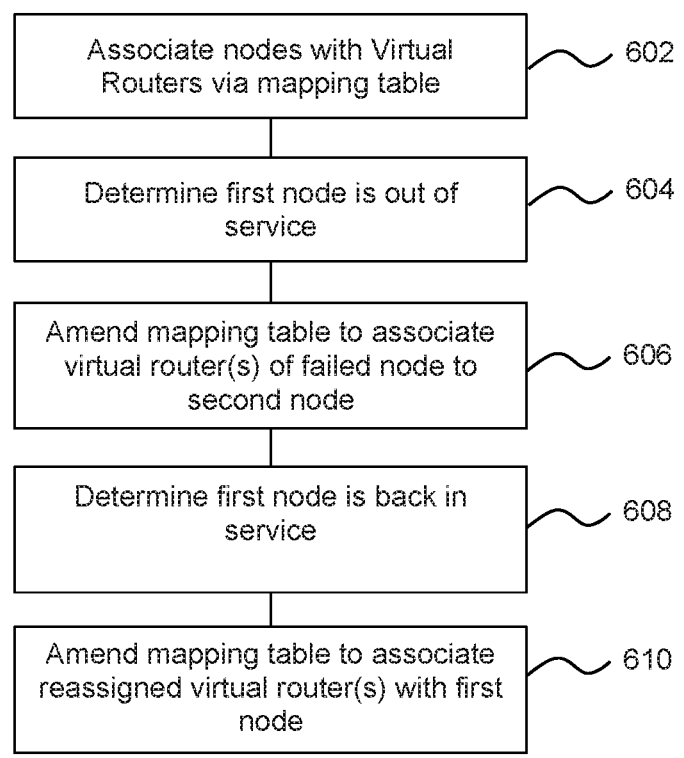
FIG. 6 is a flow chart of an example of a method of reassigning IP addresses in a containerized computing system.

If one of the nodes fail (which may be a total failure or a partial failure, i.e. the node is unhealthy), the IP addresses which were configured on the failed node may be configured on any one of the other two nodes. In this way high availability is achieved. An example of reassigning an IP address, for example in the event of that a node fails, or becomes unhealthy, may comprise utilising a mapping table associated with a node, as is now discussed with reference to FIG. 6.

In block 602, nodes are with associated Virtual Routers via a mapping table.

In one example it may be that each load balancing node 104, 400 (i.e. each node comprising a proxy manager 106 and a service firewall 108 as described above) is associated with at least one virtual router. There may be a virtual router associated with each service (although, as described below, there may be multiple instances of each virtual router).

In one example, each load balancing node 104 may act as a Master node for a virtual router. In some examples, at least one node 104 may act as a back-up node for a virtual router. In some examples, each node acts as a potential back-up node for each virtual router.

In some examples, if there are n worker nodes 104, 400, there may be n instances of a particular virtual router, where n is an integer. Each instance is provided on a different node 104, 400, and one of the nodes acts as the master node for that virtual router. In some examples, cluster manager 102 may determine which node 104 is the master node for each virtual router.

For example in a case where there are three load-balancing/worker nodes, a first node, Node_ID1, may initially be the master node for a virtual router VR_ID1, which is associated with a first service, and a back-up node for virtual routers VR_ID2 and VR_ID3 which are associated with a second and third service respectively. A second node, Node_ID2, may initially be the master node for VR_ID2, and a back-up node for VR_ID1 and VR_ID3. A third node, Node_ID3, may initially be the master node for VR_ID3, and a back-up node for VR_ID1 and VR_ID2.

The mapping between master nodes and virtual routers may be held in a Node_ID-to-VRID mapping table, which may in some examples be managed by the cluster manager 102. The cluster manager 102 may also determine which external IP address(es) is/are associated with each virtual router in a VRID-to-IP address mapping table, for example as configuration information. In some examples, the configuration may also define which interface to use to send advertisements and/or a virtual IP address for each instance of the virtual router.

Each load balancing node 104 may be configured to monitor the mappings between the VR IDs and the IP addresses. In the event of a change (e.g. a node goes out of service), the 'mastership' of the virtual router for which that node is the master node may be reassigned to another node. In some examples, the new master node may be determined using an 'election' process between the nodes.

For example, in the case that the first node, Node_ID1, goes out of service (block 604), the second node, Node_ID2, may be elected to act as master for virtual router VR_ID1 (and therefore is the master node for both virtual routers VR_ID1 and VR_ID2). The VRID-to-IP address mapping table may then be updated (block 606).

The IP addresses associated with the failed node may also be reassigned to the new 'master' node, based on the VRID-to-IP address mapping table. In practice, to effect this change, a background process (in some example, a so-called 'daemon') may be reloaded with the new configuration.

The VRID-to-IP address mapping table may change if there are changes in services. For example, if a new service is added then the IP address of that service is mapped to a VRID and appended to the list of IP addresses that are already mapped to that VRID.

If a service is deleted then the VRID-to-IP address mapping table may be updated by removing the corresponding IP address.

In some examples, if the originally designated master node for a virtual router resumes service, it will 'reclaim' its mastership of the virtual router, and the IP addresses associated with that router by the VRID-to-IP mapping table will migrate back to the originally designated master node. This may for example be achieved by setting a priority level associated with each virtual router on each node, such that the originally designated node has a higher priority level than the other nodes.

In such an example, a background process may, by reassigning the 'mastership' of a virtual router, cause the associated IP addresses to be reconfigured on a new node. This is relatively simple to implement, and provides for a high-availability cluster. For example, it may automatically allow a load to be rebalanced when a node comes back on line.

In the example above, this may mean that in the case that the first node Node_ID1 comes back into service (block 608), it may reclaim the mastership for virtual router VR_ID1 from the second node Node_ID2. In such an example, the Node_ID-to-VRID mapping table may be altered to reflect the change (block 610).

Figure 7:
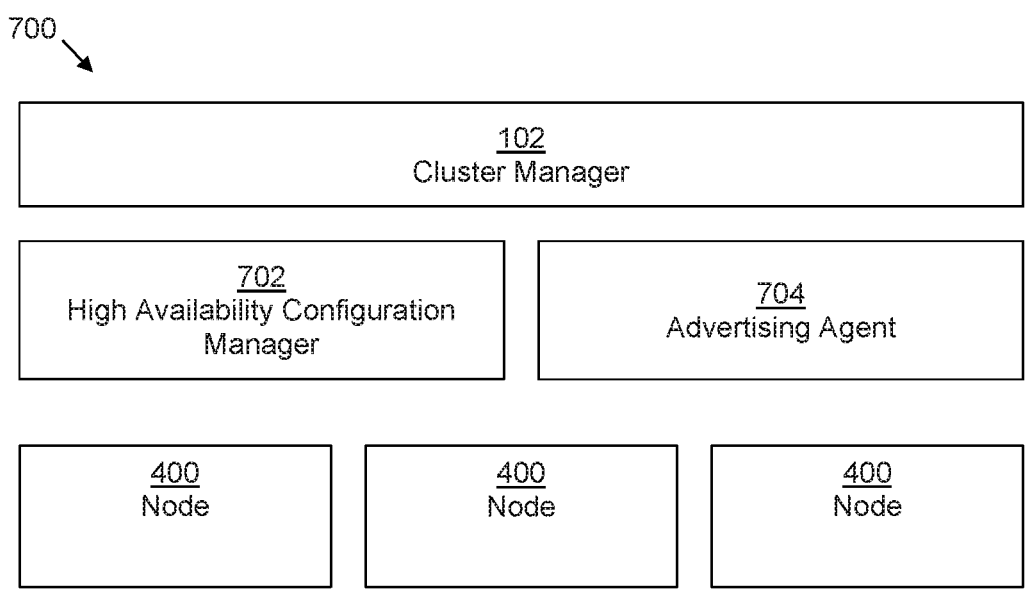
FIG. 7 is a block diagram of another example of a containerized computing management system.

FIG. 7 shows another example of a container cluster management system 700, in this example comprising the cluster manager 102 of FIG. 1 and a plurality of nodes 400 as described in relation to FIG. 4. In this example, the container cluster management system 700 further comprises a high availability configuration manager 702 to, in the event of a failure of a node, reassign the IP address of the failed node to another node. For example this may operate a process such as keepalived or proxy ARP. In some examples, this may comprise executing a method as described in FIG. 6. In addition, the container cluster management system 700 comprises an advertisement agent 704 to advertise at least one of an availability of the node (for example, as a Virtual Router Redundancy Protocol (VRRP) advertisement/response) and an accessibility of an IP address of a service to a network, for example as described in relation to block 514 above.

The high availability configuration manager 702 may be configured as a backend process (e.g. at least one 'daemon', such as keepalived), which responds to changes in a node_ID-to-VRID mapping table by reassigning the mastership of a virtual router to another node (for example, following an election of another node, or some other designation process), and thereby configuring the IP addresses associated with that virtual router on another node. In some examples, the backend process may be reloaded to effect the changes. In some examples, at least some functions of the high availability configuration manager 702 may be provided on a node 400, which may be a load balancing node 104 as described above. In other examples, other types of worker node (e.g. those without a service firewall) may be provided in the container cluster management system 700 in addition or instead of the nodes as described in FIGS. 1, 3 and 4

Examples in the present disclosure can be provided as methods, systems or machine readable instructions, such as any combination of software, hardware, firmware or the like.

In some examples, a machine readable medium may be provided which comprises instructions to cause a processing resource to perform the functionalities described above in relation to one or more blocks of FIG. 2, or 5. In some examples, the instructions may comprise the programming of any of the functional modules described in relation to FIGS. 1 and 3 and 4 and 7. In such examples, processing resource may comprise the hardware of any of the functional modules described in relation to FIGS. 1, 3, 4 and 7. As used herein, a "machine readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard disk drive (HDD)), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus functional modules of the apparatus may be implemented by a processing resource executing machine readable instructions stored in a memory, or a processing resource operating in accordance with instructions embedded in logic circuitry. The methods and functional modules may all be performed by a single processor or divided amongst several processors.

Such machine readable instructions may also be stored in a computer readable storage medium that can guide the computer or other programmable data processing devices to operate in a specific mode.

Machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some flows and/or blocks in the flow charts and/or block diagrams, as well as combinations of the flows and/or diagrams in the flow charts and/or block diagrams can be realized by machine readable instructions.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other processing resource may fulfil the functions of several units recited in the claims.

The features of any dependent claim may be combined with the features of any of the independent claims or other dependent claims, in any combination.

The invention claimed is:

1. A method comprising:
   receiving, at a node executing on a hardware processor in a container-based computing cluster, a request for a service;
   determining, by the node, if the request for the service comprises blocked service attributes in an IP table of the node;
   in response to the request not comprising blocked service attributes, performing, by the node, an address translation to forward the request to a container sub-cluster of the container-based computing cluster; and
   in response to the request comprising blocked service attributes, denying the request by the node.

2. A method according to claim 1, further comprising advertising at least one of an availability and an accessibility of an IP address of a service to a network.

3. A method according to claim 1, further comprising:
   adding, by a service firewall of the node, service-specific rules to the IP table.

4. A method according to claim 3, further comprising establishing a cluster manager and a plurality of nodes to provide the container-based computing cluster; and
   detecting a service creation event adding, by the node, service-specific rules to the IP table follow detection of the service creation event.

5. A method according to claim 3, wherein the service-specific rules restrict address translation to requests specifying a single predetermined port and/or or a single predetermined protocol.

6. The method according to claim 3, wherein the service-specific rules added to the IP table includes a deny rule for accessing the service using a first protocol or a first port.

7. A method according to claim 1, further comprising, in an event of a failure of a first node, reassigning an IP address of the first node to a second node by updating a mapping table associating a virtual router associated with the IP address such that the IP address is associated with the second node.

8. A method according to claim 7, further comprising, in an event that the first node resumes service, reassigning the IP address from the second node to the first node.

9. The method according to claim 1, further comprising monitoring, by a service monitor of the node, for at least one external service; and
   updating, by a service firewall of the node, the IP table in response to detection of an external service by the service monitor.

10. A non-transitory machine readable medium storing instructions that, when executed by a processor on which a node of a container-based computing cluster is executing, cause the node to:
   receive a request for a service;
   determine if the request for the service comprises blocked service attributes in an IP table of the node;
   respond to the request not comprising blocked service attributes by performing an address translation to forward the request to a container sub-cluster of the container-based computing cluster; and
   respond to the request comprising blocked service attributes by denying the request.

11. The non-transitory machine readable medium of claim 10 storing instructions that, when executed, cause the node to advertise at least one of an availability and an accessibility of an IP address of a service to a network.

12. The non-transitory machine readable medium of claim 10 storing instructions that, when executed, cause the node to add, by a service firewall, service-specific rules to the IP table.

13. The non-transitory machine readable medium of claim 12, wherein the service-specific rules restrict address translation to requests specifying a single predetermined port or a single predetermined protocol.

14. The non-transitory machine readable medium of claim 10 storing instructions that, when executed, cause the node to respond to a failure of a first node by reassigning an IP address of the first node to a second node by updating a mapping table associating a virtual router associated with the IP address such that the IP address is associated with the second node.

15. The non-transitory machine readable medium of claim 14 storing instructions that, when executed, cause the node to respond to the first node resuming service by reassigning the IP address from the second node to the first node.

16. A system comprising:
a processing resource; and
a non-transitory machine readable medium storing instructions that, when executed by the processing resource, cause the processing resource to:
receive a request for a service,
determine if the request for the service comprises blocked service attributes in an IP table of the node,
respond to the request not comprising blocked service attributes by performing an address translation to forward the request to a container sub-cluster of the container-based computing cluster, and
respond to the request comprising blocked service attributes by denying the request.

17. The system of claim 16, wherein the non-transitory machine readable medium stores instructions that, when executed, cause the processing resource to advertise at least one of an availability and an accessibility of an IP address of a service to a network.

18. The system of claim 16, wherein the non-transitory machine readable medium stores instructions that, when executed, cause the processing resource to add, by a service firewall, service-specific rules to the IP table.

19. The system of claim 18, wherein the service-specific rules restrict address translation to requests specifying a single predetermined port or a single predetermined protocol.

* * * * *